United States Patent [19]

Manis et al.

[11] Patent Number: 4,612,055

[45] Date of Patent: Sep. 16, 1986

[54] STABILIZED BLENDS OF THIOFUNCTIONAL POLYSILOXANE FLUIDS AND ORGANOPOLYSILOXANE FLUIDS AND A PROCESS FOR STABILIZING THE SAME

[75] Inventors: Paul A. Manis, Allentown, Pa.; Eugene R. Martin, Onsted; Ronald L. Muntz, Adrian, both of Mich.

[73] Assignee: SWS Silicones Corporation, Adrian, Mich.

[21] Appl. No.: 721,823

[22] Filed: Apr. 10, 1985

[51] Int. Cl.⁴ .............................................. C09D 1/00

[52] U.S. Cl. .................. 106/287.11; 106/287.14; 556/401; 524/262; 524/265; 524/267; 524/247; 524/249; 524/236; 524/722; 524/714; 524/447; 524/730; 524/731; 524/860; 524/789; 528/30

[58] Field of Search ............... 556/401; 524/262, 265, 524/267, 247, 249, 236, 722, 714, 447, 730, 731, 860, 789; 528/30; 106/287.11, 287.14

[56] References Cited

U.S. PATENT DOCUMENTS 4,201,308  5/1980  Neumann .......................... 524/447

Primary Examiner—Melvyn I. Marquis

[57] ABSTRACT

Siloxane fluid blends containing a thiofunctional polysiloxane fluid and an organopolysiloxane fluid are stabilized against degradation in the presence of kaolin clays at elevated temperatures by adding an amine containing compound to blends of siloxane fluids.

19 Claims, No Drawings

STABILIZED BLENDS OF THIOFUNCTIONAL POLYSILOXANE FLUIDS AND ORGANOPOLYSILOXANE FLUIDS AND A PROCESS FOR STABILIZING THE SAME The present invention relates to blends of thiofunctional polysiloxane fluids and organopolysiloxane fluids which are resistant to clay induced degradation and more particularly to a process for stabilizing blends of thiofunctional polysiloxane fluids and organopolysiloxane fluids against degradation in the presence of acid clays at elevated temperatures.

BACKGROUND OF THE INVENTION

Thiofunctional polysiloxane fluids as well as organopolysiloxane fluids may be prepared by reacting silanes or siloxanes in the presence of acid clays to form thiofunctional polysiloxane fluids and organopolysiloxane fluids. It is known that these siloxane fluids will degrade, especially at elevated temperatures, in the presence of acid clays to form volatile, lower molecular weight siloxanes and odor forming products. This often results in the loss of desirable functional groups and produces lower molecular weight siloxanes.

When blends of siloxane fluids consisting of thiofunctional polysiloxane fluids and organopolysiloxane fluids are used in an electrostatic copying apparatus to effect release between the toner treated paper which is impregnated with kaolin clay and a heated fuser roll, the siloxane fluids have a tendency to degrade and form low molecular weight siloxanes and odor producing products. It is believed that this is due to the kaolin clay which is present in the paper residue that collects in the sump along with the excess release agent. When the sump contents are reused, the combination of acidic kaolin clay and the high temperature of the fuser roll causes the siloxane fluids to degrade to form volatile, low molecular weight siloxanes having reduced functional groups. Condensation of the low molecular weight volatile siloxanes on electrical switches can inhibit the switches function due to the good dielectric properties of the siloxanes.

Therefore, it is an object of this invention to provide stabilized siloxane fluids. Another object of this invention is to provide stabilized blends of thiofunctional polysiloxane fluids and organopolysiloxane fluids. Still another object of the present invention is to provide a process for stabilizing blends of thiofunctional polysiloxane fluids and organopolysiloxane fluids against degradation in the presence of kaolin clay. A further object of this invention is to provide a process for rendering blends of thiofunctional polysiloxane fluids and organopolysiloxane fluids resistant to degradation in the presence of heat and kaolin clay without significantly affecting the properties of the siloxane fluids.

SUMMARY OF THE INVENTION

The foregoing objects and others which will become apparent from the following description are accomplished in accordance with this invention, generally speaking, by providing blends of thiofunctional polysiloxane fluids and organopolysiloxane fluids that are stable in the presence of kaolin clay, which comprises adding an amine containing compound to a blend consisting of a thiofunctional polysiloxane fluid and an organopolysiloxane fluid, in which the amine containing compound is present in the blend in an amount of from 0.001 to 10 percent by weight based on the weight of the amine containing compound and the thiofunctional polysiloxane fluid and organopolysiloxane fluid at a temperature of from about 20° C. to 200° C.

DETAILED DESCRIPTION OF THE INVENTION

The thiofunctional polysiloxane fluids which are employed in the blends of this invention are represented by the formula

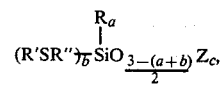

where
R is a monovalent hydrocarbon radical or a halogenated monovalent hydrocarbon radical having from 1 to 18 carbon atoms,
R' is hydrogen or a monovalent hydrocarbon radical having from 1 to 18 carbon atoms,
R" is a divalent hydrocarbon radical free of aliphatic unsaturation having from 2 to 28 carbon atoms, hydrocarbon ether radicals or hydrocarbon thioether radicals, in which R" is bonded to the silicon atom via a silicon carbon bond,
Z is a radical selected from an $R'O_{0.5}$ or $R_3SiO_{0.5}$ radical,
a is a number of from 0 to 2,
b is a number of from 1 to 3 and the sum of a+b is equal to at least 2, and
c is a number of from 0 to 3.

The thiofunctional polysiloxane fluids may also be copolymers containing from 1 to 99 mole percent of siloxane units of the formula

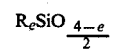

and from 99 to 1 mole percent of siloxane units having at least one thiol unit of the formula

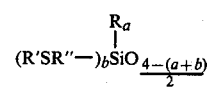

in which R, R', R", a and b are the same as above and e is a number of from 0 to 2. These copolymers may also contain $R'O_{0.5}$ and $R_3SiO_{0.5}$ units in which R and R' are the same as above.

Suitable examples of monovalent hydrocarbon radicals represented by R are alkyl radicals, such as the methyl, ethyl, propyl, butyl, octyl, dodecyl and octadecyl radicals; aryl radicals, such as the phenyl and naphthyl radicals; alkenyl radicals, such as the vinyl and allyl radicals; cycloalkyl radicals, such as the cyclobutyl, cyclopentyl and cyclohexyl radicals; alkaryl radicals, such as the tolyl, xylyl and ethylphenyl radicals and aralkyl radicals, such as the benzyl, α-phenylethyl, B-phenylethyl and α-phenylbutyl radicals.

Examples of halogenated monovalent hydrocarbon radicals represented by R are the haloalkyl radicals such as the 3,3,3-trifluoropropyl radical and halaryl radicals such as the o-, m- and p-chlorophenyl radicals.

Examples of monovalent hydrocarbon radicals represented by R' are alkyl radicals, such as the methyl, ethyl, propyl, butyl, octyl, dodecyl and octadecyl radicals; aryl radicals, such as the phenyl and naphthyl radicals, alkenyl radicals such as the vinyl and allyl radicals; cycloalkyl radicals, such as the cyclobutyl, cyclopentyl and cyclohexyl radicals; alkaryl radicals, such as the tolyl, xylyl and ethylphenyl radicals and aralkyl radicals, such as the benzyl, α-phenylethyl, B-phenylethyl and α-phenylbutyl radicals.

Examples of suitable divalent hydrocarbon radicals represented by R″ are ethylene, trimethylene, tetramethylene, hexamethylene, octamethylene and the like.

Examples of suitable divalent hydrocarbon ether radicals represented by R″ are those having the formulas R‴(—OC$_2$H$_4$—)$_r$, R‴(—OC$_2$H$_4$OCH$_2$)$_r$, R‴(—OC$_3$H$_6$—)$_r$ and R‴(—OC$_4$H$_8$—)$_r$, as well as the corresponding thio radicals where sulfur is substituted for the oxygen in the hydrocarbon ether radicals, where R‴ is a divalent hydrocarbon radical having from 1 to 4 carbon atoms and r is a number of from 1 to 20.

Suitable examples of divalent hydrocarbon radicals represented by R‴ having from 1 to 4 carbon atoms are methylene, ethylene, propylene and butylene radicals.

The thiofunctional polysiloxane fluids may be prepared in accordance with U.S. Pat. No. 4,046,795 to Martin, in which a disiloxane and/or a hydroxy or hydrocarbonoxy containing silane or siloxane is equilibrated with a cyclic trisiloxane in the presence of an acid catalyst and at least one of the above organosilicon compounds contain a thiol group.

Catalysts which may be employed in effecting the reaction between a disiloxane and/or a hydroxy and/or hydrocarbonoxy containing silane or siloxane and a cyclic trisiloxane in which at least one of the reactants contains a thiol group are acid clays and organic and inorganic acids having a pK value less than 1.0 and more preferably below 0.7 in an aqueous solution. Suitable acid catalysts which may be employed are benzenesulfonic acid, para-toluene-sulfonic acid, sulfuric acid, sulfurous acid, nitric acid, perchloric acid, hydrochloric acid and acid clays such as Filtrol No. 13 and No. 24 (available from Filtrol Corporation).

The amount of catalyst is not critical, although it is preferred that from 0.003 percent up to about 10 percent by weight of catalyst be used based on the total weight of the reactants, i.e., the silicon containing compounds used in the preparation of the thiofunctional polysiloxane fluids. Greater amounts of catalyst may be used; however, the amount of catalyst should not be so great that will alter the functionality of the resultant composition.

The catalyst may be removed or destroyed after the reaction is complete by washing with water or they may be destroyed by neutralizing with basic reagents. In addition, certain catalysts, such as acid clays, may be removed by filtration.

The reactions may be conducted at any temperature ranging from about 25° C. up to about 200° C. over a period of time ranging from 0.5 hours up to several days and, if desired, in the presence of a hydrocarbon solvent. Under certain conditions, for example when an anhydrous acid catalyst is employed, a catalytic amount of a protic compound is required to effect the reaction. The term protic compound refers to compounds having a reactive hydrogen such as alcohols, e.g., methanol, ethanol, propanol, butanol and water. The amount of protic compound is based on the total weight of the silicon containing reactants.

The reaction may be conducted at atmospheric, subatmospheric or superatmospheric pressure in the presence or absence of a solvent. When a solvent is employed, it may be employed in an amount of from about 1 to 50 percent by weight based on the weight of silicon containing reactants. Examples of suitable hydrocarbon solvents are heptane, benzene, toluene, xylene and the like. It is, however, preferred that the reaction be conducted in an inert atmosphere.

Hydroxy and hydrocarbonoxy containing silanes which may be employed are silanes such as 3-mercaptopropyltrimethoxysilane, 2-mercaptoethyltriethoxysilane, w-mercaptodecyltriethoxysilane, 2-mercaptohexyltripropoxysilane, w-mercaptoamyltriethoxysilane, 2-(triethoxysilyl)ethyl butyl thioether, 3-(triethoxysilyl)propyl butyl thioether, 4-(triethoxysilyl)butyl methyl thioether, 2-(methyldiethoxysilyl)ethyl methyl thioether, 2-(methyldiethoxysilyl)ethyl phenyl thioether, 2-(methyldiethoxysilyl)ethyl dodecyl thioether, 6-(trimethoxysilyl)hexyl ethyl thioether, methyltriethoxysilane, dimethyldiethoxysilane, trimethylethoxysilane, dimethylsilane diol, diphenylsilane diol and the like.

The corresponding siloxanes or copolymers thereof which contain at least one or more alkoxy or hydroxy groups may also be employed. Suitable examples of these polysiloxanes are monoethoxy-endblocked beta-mercaptoethylpropylpolysiloxane, methyldiethoxysilyl-endblocked beta-mercaptobutylmethylpolysiloxane, monohydroxy-endblocked beta-mercaptoethylmethylpolysiloxane, dihydroxy-endblocked dimethylpolysiloxane, diethoxy-endblocked dimethylpolysiloxane and the like.

Examples of suitable disiloxanes are hexamethyldisiloxane, hexaethyldisiloxane, hexapropyldisiloxane, hexaoctyldisiloxane, bis-(3-mercaptopropyl)tetramethyldisiloxane and the like.

Examples of suitable cyclic siloxanes are hexamethylcyclotrisiloxane, hexaethylcyclotrisiloxane, hexaphenylcyclotrisiloxane, hexabutylcyclotrisiloxane, hexaoctylcyclotrisiloxane, 1,2,3-trimethyl-1,2,3-triphenylcyclotrisiloxane and the like.

The thiofunctional polysiloxane fluids employed in the process of this invention may, for example, be prepared in accordance with the process described in U.S. Pat. No. 4,046,795 to Martin, which is incorporated herein by reference.

Thiofunctional polysiloxane fluids may also be prepared by reacting hydroxyl containing polysiloxanes with silanes containing thiol groups or by the cohydrolysis of chloroalkylchlorosilanes, dialkyldichlorosilanes and trimethylchlorosilanes and thereafter reacting the chloroalkyl groups with sulfur containing compounds such as sodium sulfohydride in the presence of dimethylformamide. These thiofunctional polysiloxane fluids and their methods of preparation are described in U.S. Pat. Nos. 3,346,405 to Viventi; 2,960,492 to Morton and 3,388,144 to Musolf et al.

Organopolysiloxane fluids which may be combined with the thiofunctional polysiloxane fluids may be represented by the general formula

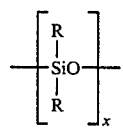

wherein the R(s), which may be the same or different, represent monovalent hydrocarbon radicals or halogenated monovalent hydrocarbon radicals having from 1 to 18 carbon atoms and x is a number greater than 8.

The radicals represented by R in the above formula 5 are the same as those described heretofore for the R radicals.

Any linear, branched or cyclic organopolysiloxanes having an average of from 1.75 to 2.25 organic radicals per silicon atom may be employed. The organopolysiloxanes may be triorganosiloxy, alkoxy or hydroxy terminated; however, they should be free of aliphatic unsaturation. It is preferred that the polysiloxanes have a viscosity of between about 5 and 1,000,000 mPa.s and more preferably between about 50 and 300,000 mPa.s at 25° C. Also, it is possible to combine high and low viscosity fluids to form a fluid having the desired viscosity. High molecular weight gums may also be employed, however, it is preferred that these gums be dissolved in an organic solvent before they are combined with the thiofunctional polysiloxanes.

Examples of suitable organopolysiloxanes are trialkylsiloxy-endblocked diorganopolysiloxanes such as trimethylsiloxy-endblocked dimethylpolysiloxanes; hydroxy terminated diorganopolysiloxanes such as dimethylpolysiloxanes, diethylpolysiloxanes, dipropylpolysiloxanes and alkoxy terminated diorganopolysiloxanes such as methoxy terminated dimethylpolysiloxanes, ethoxy terminated dimethylpolysiloxanes, propoxy terminated organopolysiloxanes containing dimethyl or diethyl or dipropyl siloxanes.

The thiofunctional polysiloxane fluids may be present in the blends in an amount of from about 0.1 percent to about 90 percent by weight and the organopolysiloxane fluids are present in an amount of from about 10 percent up to about 99.9 percent by weight based on the weight of the blend composition. It is preferred that the composition contain from about 1.0 to about 30 percent by weight of the thiofunctional polysiloxane and from about 70 percent to 99 percent by weight of organopolysiloxane fluid based on the weight of the thiofunctional polysiloxane fluid and the organopolysiloxane fluid.

Although it is not essential, the blend may be diluted with organic solvents to form a solution containing from 0.1 to 99 percent and more preferably from about 1.0 to 20 percent by weight of blended fluids, based on the weight of the composition, i.e., the solvent and the blended siloxanes. Suitable examples of organic solvents are aliphatic hydrocarbons such as hexane, heptane and octane; aromatic hydrocarbons such as benzene, toluene, xylene, ethylbenzene and naphtha; halogenated hydrocarbons such as methylene chloride, perchloroethylene, trichloroethylene and carbon tetrachloride; ethers and polyethers such as diethyl ether, dimethyl ether, dibutyl ether, diethylene glycol dimethyl ether, diethylene glycol diethyl ether and the like. Preferably the solvent is methylene chloride or perchloroethylene.

Amine containing compounds which may be employed as stabilizing agents are organic amines having the general formula

aminofunctional silanes of the formula

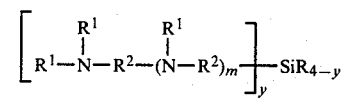

and aminofunctional siloxanes of the formula

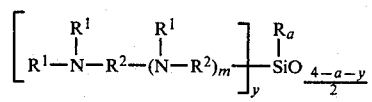

where R is the same as above, $R^1$ which may be the same or different represents hydrogen or monovalent hydrocarbon radicals having from 1 to 30 carbon atoms which may be substituted with hydroxyl groups, $R^2$, which is the same or different, is a divalent hydrocarbon radical having from 1 to 20 carbon atoms, a is a number of from 0 to 2, m is an integer of from 0 to 20 and y is a number of from 1 to 4.

Examples of monovalent hydrocarbon radicals represented by $R^1$ are alkyl radicals such as the methyl, ethyl, propyl, butyl, hexyl, octyl, decyl, dodecyl, hexadecyl, octadecyl, eicosyl, docosyl, hexacosyl, octacosyl and triacontyl radicals; alkenyl radicals such as ethenyl, 1-propenyl, 1-isobutenyl, and the various isomers of heptenyl, octenyl, nonenyl, dodecenyl, heptadecenyl, nonadecenyl and eicosenyl; aryl radicals such as the phenyl, α-naphthyl, B-naphthyl and the α-anthryl radicals; alkaryl radicals such as the o-tolyl, m-tolyl, 2,3-xylyl, 2,4-xylyl, o-cumenyl, m-cumenyl, o-ethylphenyl, m-ethylphenyl, p-ethylphenyl, 2-methyl-α-naphthyl, 1-ethyl-B-naphthyl, 2,3-dipropyl-α-naphthyl radicals and aralkyl radicals such as the benzyl, α-phenylethyl, B-phenylethyl, 2-phenylbutyl, α'-naphthylmethyl, α-(α'-naphthyl)ethyl and the corresponding α' and B' naphthyl derivatives of n-amyl up to and including the octadecyl radical.

Examples of divalent hydrocarbon radicals represented by $R^2$ are alkylene radicals such as ethylene, trimethylene, tetramethylene, hexamethylene, octamethylene, tetradecamethylene, octadecamethylene and arylene radicals such as phenylene diphenylene and naphthylene radicals.

Examples of suitable organic amines which may be employed are aliphatic and aromatic, primary, secondary and tertiary amines such as isopropylamine, n-propylamine, n-butylamine, sec-butylamine, tert-butylamine, N-methyl-N-ethylamine, N-methyl-N-ethylisopropylamine, 2-amino-3-methylbutane, N,N-dimethylethylamine, allylamine, n-amylamine, isoamylamine, n-hexylamine, n-octylamine, n-decylamine, N,N-diethylpropylamine, ethanolamine, diethanolamine, triethanolamine, ethylenediamine, diethylenetriamine, triethylenetetramine, aniline, methylaniline, dimethylaniline, ethylaniline, o, m or p-toluidine, 2,3-dimethylaniline, 3,5-dimethylaniline, 2,4-dimethylaniline, diphenylamine, and triphenylamine, p-phenylenediamine, 4,4'-diaminodiphenylmethane.

Other amines which may be employed are those having the formulas

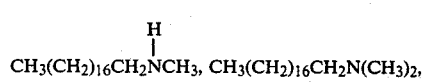

-continued

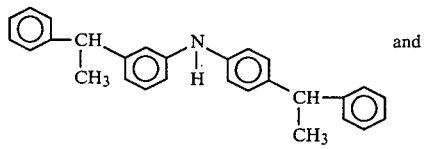
and

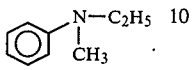

Amine containing silicon compounds which may be used in the process of this invention are amino-functional silanes and siloxanes. Examples of aminofunctional silanes which may be employed are beta-aminopropyltriethoxysilane, gamma-aminopropyltrimethoxysilane, methyl-beta-(aminoethyl)-gamma-aminopropyldimethoxysilane, omega-aminohexyltributoxysilane, beta-(aminoethyl)propyltrimethoxysilane, beta-(aminoethyl)hexyltriethoxysilane, beta-(aminopropyl)-butyltributoxysilane, (trimethylsilylpropyl)ethylenediamine and (trimethylsilylisobutyl)-ethylenediamine.

The aminofunctional siloxanes employed in the process of this invention are well known in the art. They may be prepared in accordance with the process described in U.S. Pat. No. 2,947,771 to Bailey, in which an aminofunctional silane is equilibrated with a siloxane in the presence of an alkali-metal hydroxide. Also, they may be prepared in accordance with the process described in U.S. Pat. No. 3,598,853 to Friedman et al, in which an aminofunctional silane is condensed with a silanol terminated polydiorganosiloxane. Other methods for preparing aminofunctional siloxane fluids are described in U.S. Pat. Nos. 3,890,269 to Martin; 2,930,809 to Jex et al and 3,045,036 to Jex et al. The aminofunctional siloxanes described in these references and their methods of preparation are incorporated herein by reference.

Representative examples of aminofunctional siloxanes are

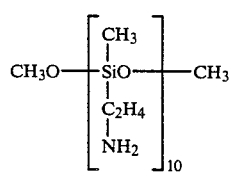

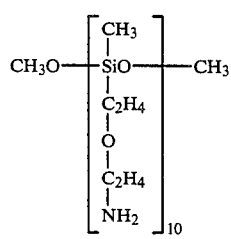

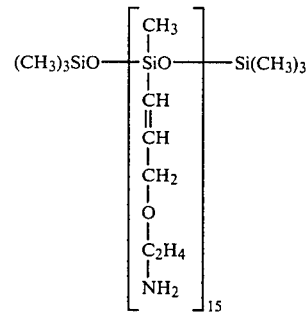

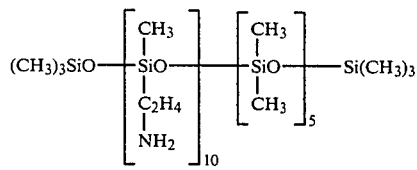

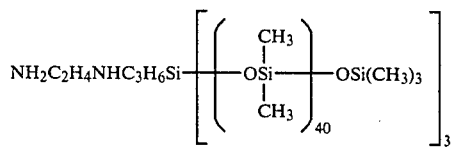

and the like.

The aminofunctional organopolysiloxane copolymers may be prepared in accordance with the procedure described in U.S. Pat. No. 3,544,498 to Holdstock et al, in which a mixture containing the silanol chain-terminated polyorganosiloxane and an aminoalkoxyalkylsilane or aminoalkoxyalkenylsilane and if desired, an aminoalkylsilane are partially hydrolyzed and condensed by adding the necessary amount of water to provide the degree of hydrolysis and condensation desired. Generally, the amount of hydrolysis and condensation desired is that amount which will result in a copolymer having the desired viscosity and the desired alkoxy content. After the partial hydrolysis and condensation, the reaction mixture consists of the organopolysiloxane copolymer, free alcohol corresponding to the alkoxy group which is hydrolyzed from the silane by the water addition and water resulting from the condensation of the silanol groups. The water and alcohol are stripped from the reaction mixture at reduced pressure and at a temperature ranging from room temperature up to about 60° C. and more preferably at a temperature up to about 40° C.

The amount of amine containing compound which may be added to the blend consisting of thiofunctional polysiloxane fluids and organopolysiloxane fluids to prevent degradation in the presence of acid clays may range from about 0.001 up to about 10 percent by weight, preferably from about 0.005 to 5 percent by weight and more preferably from about 0.1 to about 1 percent based on the weight of the blend consisting of the thiofunctional polysiloxane fluids, the organopolysiloxane fluids and the amine containing compound.

It is preferred that the amine containing compound be added to the blend of siloxane fluids at a temperature of from about 20° C. to 40° C. and then heated up to a temperature of about 80° C. and more preferably from about 60° C. to 80° C. However, it has been found that the blend of siloxane fluids consisting of thiofunctional polysiloxane fluids and organopolysiloxane fluids may be stabilized in the absence of heat by merely mixing the amine with the blend of thiofunctional polysiloxane fluids and organopolysiloxane fluids at temperatures as low as 20° C.

The blend of siloxane fluids consisting of thiofunctional polysiloxane fluids and organopolysiloxane fluids obtained from the process of this invention are stable at elevated temperatures in the presence of acid clays. These siloxane fluid blends may be used as fuser agents in an electrostatic copying apparatus where they contact clay impregnated paper without gelling even at elevated temperatures.

Specific embodiments of this invention are further illustrated in the following examples in which all parts are by weight unless otherwise specified.

PREPARATION OF THIOFUNCTIONAL POLYSILOXANE FLUIDS

The thiofunctional polysiloxane fluids used in the following examples were prepared in the following manner:

(A) A thiofunctional polysiloxane fluid is prepared by adding 167 parts of 3-mercaptopropyltrimethoxysilane, 140 parts of water, 250 parts of toluene, 100 parts of hexamethyldisiloxane and 60 parts of Filtrol No. 13 acid clay (available from Filtrol Corporation) to a reaction vessel containing 2770 parts of hexamethylcyclotrisiloxane heated to 70° C. The vessel is then heated to 100° C. and maintained at this temperature for three hours. The contents of the vessel are then cooled to 60° C. and filtered. The volatiles are stripped off for about 3 hours at about 190° C. at less than 1 torr. A clear, transparent liquid is obtained having a viscosity of about 115 mPa.s at 25° C. Nuclear Magnetic Resonance (NMR) analysis shows that the product has a mol ratio of $HSC_3H_6:Si(CH_3)_2$ of 1:42. The SH content of the product is about 0.72 percent.

(B) A thiofunctional polysiloxane fluid is prepared by adding 80 parts of 3-mercaptopropyltrimethoxysilane to a reaction vessel containing 1184 parts of a hydroxyl terminated dimethylpolysiloxane having a viscosity of about 350 mPa.s at 25° C. and containing 2.43 percent by weight of hydroxyl groups. The reactants are heated to 200° C. for one hour and then vacuum stripped for two hours at 200° C. at less than 1 torr. A clear product having a viscosity of about 72.1 mPa.s at 25° C. is obtained which by Nuclear Magnetic Resonance has a ratio of $CH_3O:HSC_3H_6:Si(CH_3)_2$ of 1.58:1.0:32.4. The percent of SH is about 0.79 percent.

EXAMPLE 1

A composition is prepared by mixing varying amounts of 4,4'-bis-(alpha-methylbenzyl)diphenylamine of the formula

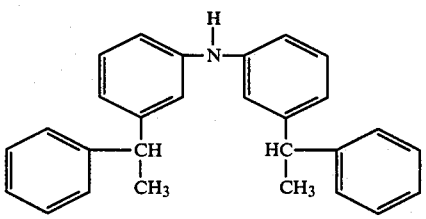

with a blend of siloxane fluids consisting of 10 parts by weight of the thiofunctional polysiloxane fluid prepared in (A) above and 90 parts by weight of a trimethyl-siloxy-endblocked dimethylpolysiloxane fluid having a viscosity of about 300 mPa.s at 25° C. at a temperature of about 25° C. About 5 parts of each composition prepared above are placed in each of two aluminum evaporating dishes. To one dish is added 0.1 part of Kaolin clay (available from R. T. Vanderbilt Co.). The aluminum dishes are placed in a forced air oven for 24 hours at 200° C. The percent of weight loss is determined. The results are shown in Table I.

COMPARISON EXAMPLE V₁

The procedure of Example 1 is repeated, except that the 4,4'-bis-(alpha-methylbenzyl)diphenylamine is omitted. The result is shown in Table I.

TABLE I

| Example No. | Siloxane Blend, (Parts) | Amine Compound | Amine Cpd. (Parts) | Weight Loss (Percent) Without Kaolin Clay | Weight Loss (Percent) With Kaolin Clay |
| --- | --- | --- | --- | --- | --- |
| (a) | 99.99 | MBD | 0.01 | 0.34 | 10.00 |
| (b) | 99.975 | MBD | 0.025 | 0.40 | 3.4 |
| (c) | 98 | MBD | 2.0 | 2.8 | 3.0 |
| Comparison Example V₁ | 100 | — | — | 0.33 | 21.86 |

MBD = 4,4'-bis-(alpha-methylbenzyl)diphenylamine

EXAMPLE 2

The procedure of Example 1 is repeated, except that one part of kaolin clay is substituted for 0.1 part of kaolin clay. The results are shown in Table II.

COMPARISON EXAMPLE V₂

The procedure of Example 2 is repeated, except that the 4,4'-bis-(alpha-methylbenzyl)diphenylamine is omitted. The results are shown in Table II.

TABLE II

| Example No. | Siloxane Blend, (Parts) | Amine Compound | Amine Cpd. (Parts) | Weight Loss (Percent) Without Kaolin Clay | Weight Loss (Percent) With Kaolin Clay |
| --- | --- | --- | --- | --- | --- |
| 2(a) | 99.95 | MBD | .05 | 0.53 | 57.8 |
| (b) | 98 | MBD | 2.0 | 2.26 | 3.52 |
| Comparison Example V₂ | 100 | — | — | 0.30 | 82.4 |

MBD = 4,4'-bis-(alpha-methylbenzyl)diphenylamine

EXAMPLE 3

The procedure of Example 1 is repeated, except that 10 parts of a diaminosiloxane fluid of the formula

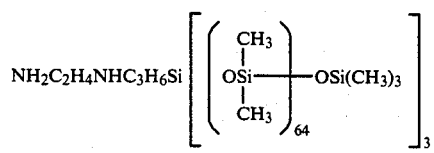

are mixed with 90 parts of a siloxane blend consisting of 10 parts of the thiofunctional polysiloxane fluid prepared in accordance with (A) above and 90 parts of a trimethylsiloxy-endblocked dimethylpolysiloxane fluid. The result is shown in Table III.

TABLE III

| Example No. | Siloxane Blend, (Parts) | Amine Compound | Amine Cpd. (Parts) | Weight Loss (Percent) Without Kaolin Clay | Weight Loss (Percent) With Kaolin Clay |
| --- | --- | --- | --- | --- | --- |
| 3 | 90 | 3 Dp | 10 | 5.64 | 5.63 |
| Comparison Example | | | | | |
| V₃ | 100 | — | — | 0.33 | 21.86 |

3 Dp = diaminosiloxane fluid

EXAMPLE 4

The procedure of Example 1 is repeated, except that 10 parts of the thiofunctional polysiloxane fluid prepared in (B) above are substituted for the thiofunctional polysiloxane fluid prepared in (A) above. The volatiles developed as a result of heating the thiofunctional polysiloxane fluid in the presence of kaolin clay are substantially reduced.

EXAMPLE 5

The procedure of Example 1 is repeated, except that 0.15 parts of 3-aminopropylethoxysilane are substituted for the 4,4'-bis-(alpha-methylbenzyl)diphenylamine.

EXAMPLE 6

The procedure of Example 1 is repeated, except that 0.5 parts of an aminofunctional polysiloxane fluid prepared below are substituted for the 4,4'-bis-(alpha-methylbenzyl)diphenylamine. The volatiles developed as the result of heating the thiofunctional polysiloxane fluid in the presence of kaolin clay are substantially reduced.

The aminofunctional polysiloxane fluid used in this example is prepared by heating a mixture containing about 26 parts of beta-(aminoethyl)-gamma-aminopropyltrimethoxysilane and 0.03 parts of potassium hydroxide to a temperature of 145° C. for three hours. After cooling the liquid product to room temperature, 0.03 parts of acetic acid are added to neutralize the catalyst. The product is filtered and a liquid product having a viscosity of about 40 mPa.s at 25° C. is recovered. Nuclear Magnetic Resonance (NMR) analysis indicates that the ratio of beta-(aminoethyl)-gamma-aminopropyl:OCH₃:(CH₃)₂SiO groups is about 1:3:36.

EXAMPLE 7

The procedure of Example 1 is repeated, except that 0.1 part of diphenylamine is substituted for the 4,4'-bis-(alpha methylbenzyl)diphenylamine. The results are shown in Table IV.

EXAMPLE 8

The procedure of Example 1 is repeated, except that methyl octadecylamine is substituted for the 4,4'-bis-(alpha methylbenzyl)diphenylamine. The results are shown in Table IV.

EXAMPLE 9

The procedure of Example 1 is repeated, except that 2-aminoethyl-3-aminopropyltrimethoxysilane is substituted for the 4,4'-bis-(alpha methylbenzyl)diphenylamine. The results are shown in Table IV.

TABLE IV

| Example No. | Siloxane Blend, (Parts) | Amine Compound | Amine Cpd. (Parts) | Weight Loss (Percent) Without Kaolin Clay | Weight Loss (Percent) With Kaolin Clay |
| --- | --- | --- | --- | --- | --- |
| 7 | 99.9 | DPA | 0.1 | 0.43 | 2.22 |
| 8(a) | 99.95 | MODA | 0.05 | 0.40 | 2.49 |
| 8(b) | 99.9 | MODA | 0.1 | 0.61 | 1.29 |
| 9(a) | 99.95 | AEAPMS | 0.05 | 0.68 | 2.18 |
| (b) | 99.9 | AEAPMS | 0.1 | 0.97 | 1.54 |
| (c) | 99.0 | AEAPMS | 1.0 | 1.57 | 1.72 |
| Comparison Example | | | | | |
| V₁ | 100 | — | — | 0.34 | 21.82 |

DPA = Diphenylamine
MODA = Methyl octadecylamine
AEAPMS = 2-aminoethyl-3-aminopropyltrimethoxysilane

What is claimed is:

1. A stabilized composition comprising a blend of a thiofunctional polysiloxane fluid having units of the formula

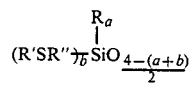

where R is selected from the group consisting of a monovalent hydrocarbon radical having from 1 to 18 carbon atoms and a halogenated monovalent hydrocarbon radical having from 1 to 18 carbon atoms, R' is selected from the group consisting of hydrogen and a monovalent hydrocarbon radical having from 1 to 18 carbon atoms, R" is selected from the group consisting of a divalent hydrocarbon radical free of aliphatic unsaturation having from 2 to 28 carbon atoms, a hydrocarbon ether radical and a hydrocarbon thioether radical in which R" is bonded to the silicon atom via a silicon carbon bond, a is a number of from 0 to 2, b is a number of from 1 to 3 and the sum of a+b is equal to at least 2, and an organopolysiloxane fluid having the formula

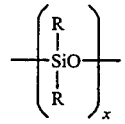

where R is selected from the group consisting of a monovalent hydrocarbon radical having from 1 to 18 carbon atoms and a halogenated monovalent hydrocarbon radical having from 1 to 18 carbon atoms and the terminal groups are selected from the group consisting of triorganosiloxy, alkoxy and hydroxy groups and x is a number greater than 8 and an amine containing compound selected from the group consisting of an organic amine, an aminofunctional silane and an aminofunctional siloxane, in an amount of from 0.001 to 10 percent by weight based on the weight of the amine containing compound and the blend containing the thiofunctional polysiloxane fluid and the organopolysiloxane fluid.

2. The stabilized composition of claim 1, wherein the amine containing compound is an organic amine of the formula

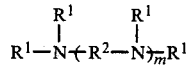

where $R^1$ is selected from the group consisting of hydrogen, monovalent hydrocarbon radicals having from 1 to 30 carbon atoms and monovalent hydrocarbon radicals substituted with hydroxyl groups, $R^2$ is a divalent hydrocarbon radical having from 1 to 20 carbon atoms and m is an integer of from 0 to 20.

3. The stabilized composition of claim 1, wherein the amine containing compound is an aminofunctional silane of the formula

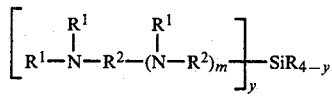

where R is selected from the group consisting of a monovalent hydrocarbon radical having from 1 to 18 carbon atoms and a halogenated monovalent hydrocarbon radical having from 1 to 18 carbon atoms, $R^1$ is selected from the group consisting of hydrogen, monovalent hydrocarbon radicals having from 1 to 30 carbon atoms and monovalent hydrocarbon radicals substituted with hydroxyl groups, $R^2$ is a divalent hydrocarbon radical having from 1 to 20 carbon atoms, m is an integer of from 0 to 20 and y is a number of from 1 to 4.

4. The stabilized composition of claim 1, wherein the amine containing compound is an aminofunctional siloxane of the formula

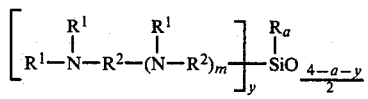

where R is selected from the group consisting of a monovalent hydrocarbon radical having from 1 to 18 carbon atoms and a halogenated monovalent hydrocarbon radical having from 1 to 18 carbon atoms, $R^1$ is selected from the group consisting of hydrogen, monovalent hydrocarbon radicals having from 1 to 30 carbon atoms and monovalent hydrocarbon radicals substituted with hydroxyl groups, $R^2$ is a divalent hydrocarbon radical having from 1 to 20 carbon atoms, a is a number of from 0 to 2, m is an integer of from 0 to 20 and y is a number of from 1 to 4.

5. The stabilized composition of claim 2, wherein at least one $R^1$ is a monovalent hydrocarbon radical substituted with a hydroxyl group.

6. The stabilized composition of claim 1, wherein the aminofunctional silane is 3-aminopropyltriethoxysilane.

7. The stabilized composition of claim 1, wherein the aminofunctional silane is 2-aminoethyl-3-aminopropyltrimethoxysilane.

8. The stabilized composition of claim 1, wherein the amine containing compound is present in an amount of from about 0.005 to about 2 percent by weight based on the weight of the amine containing compound and the blend containing the thiofunctional polysiloxane fluid and the organopolysiloxane fluid.

9. The stabilized composition of claim 1, wherein the amine containing compound is present in an amount of from about 0.1 to about 1 percent by weight based on the weight of the amine containing compound and blend containing the thiofunctional polysiloxane fluid and the organopolysiloxane fluid.

10. The stabilized composition of claim 1, wherein the composition contains kaolin clay.

11. A process for stabilizing a composition containing a blend of siloxane fluids which comprises adding an amine containing compound selected from the group consisting of an organic amine, an aminofunctional silane and an aminofunctional siloxane to a blend of siloxane fluids containing a thiofunctional polysiloxane fluid having units of the formula

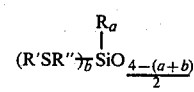

where R is selected from the group consisting of a monovalent hydrocarbon radical having from 1 to 18 carbon atoms and a halogenated monovalent hydrocarbon radical having from 1 to 18 carbon atoms, R' is selected from the group consisting of hydrogen and a monovalent hydrocarbon radical having from 1 to 18 carbon atoms, R" is selected from the group consisting of a divalent hydrocarbon radical free of aliphatic unsaturation having from 2 to 18 carbon atoms, a hydrocarbon ether radical and a hydrocarbon thioether radical in which R" is bonded to the silicon atom via a silicon-carbon bond, a is a number of from 0 to 2, b is a number of from 1 to 3 and the sum of a+b is equal to at least 2, and an organopolysiloxane fluid having the formula

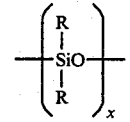

where R is selected from the group consisting of a monovalent hydrocarbon radical having from 1 to 18 carbon atoms and a halogenated monovalent hydrocarbon radical having from 1 to 18 carbon atoms and the terminal groups are selected from the group consisting of triorganosiloxy, alkoxy and hydroxy groups and x is a number greater than 8, in which the amine containing compound is present in an amount of from about 0.001 to about 10 percent by weight based on the weight of the amine containing compound and the blend containing the thiofunctional polysiloxane fluid and the organopolysiloxane fluid.

12. The process of claim 11, wherein the composition contains kaolin clay.

13. The process of claim 11, wherein the amine containing compound is an organic amine of the formula

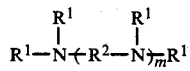

where $R^1$ is selected from the group consisting of hydrogen, monovalent hydrocarbon radicals having from 1 to 30 carbon atoms and monovalent hydrocarbon radicals substituted with hydroxyl groups, $R^2$ is a divalent hydrocarbon radical having from 1 to 20 carbon atoms and m is an integer of from 0 to 20.

14. The process of claim 11, wherein the amine containing compound is an aminofunctional silane of the formula

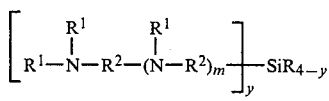

where R is selected from the group consisting of a monovalent hydrocarbon radical having from 1 to 18 carbon atoms and a halogenated monovalent hydrocarbon radical having from 1 to 18 carbon atoms, $R^1$ is selected from the group consisting of hydrogen, monovalent hydrocarbon radicals having from 1 to 30 carbon atoms and monovalent hydrocarbon radicals substituted with hydroxyl groups, $R^2$ is a divalent hydrocarbon radical having from 1 to 20 carbon atoms, m is an integer of from 0 to 20 and y is a number of from 1 to 4.

15. The process of claim 11, wherein the amine containing compound is an aminofunctional siloxane of the formula

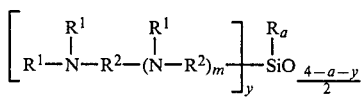

where R is selected from the group consisting of a monovalent hydrocarbon radical having from 1 to 18 carbon atoms and a halogenated monovalent hydrocarbon radical having from 1 to 18 carbon atoms, $R^1$ is selected from the group consisting of hydrogen, monovalent hydrocarbon radicals having from 1 to 30 carbon atoms and monovalent hydrocarbon radicals substituted with hydroxyl groups, $R^2$ is a divalent hydrocarbon radical having from 1 to 20 carbon atoms, a is a number of from 0 to 2, m is an integer of from 0 to 20 and y is a number of from 1 to 4.

16. The process of claim 13, wherein at least one $R^1$ is a monovalent hydrocarbon radical substituted with a hydroxyl group.

17. The process of claim 11, wherein the amine containing compound and the siloxane blend containing the thiofunctional polysiloxane fluid and organopolysiloxane fluid are heated to a temperature up to 200° C.

18. The process of claim 13, wherein the amine containing compound and the siloxane blend containing the thiofunctional polysiloxane fluid and organopolysiloxane fluid are heated to a temperature up to 200° C.

19. The process of claim 15, wherein the thiofunctional polysiloxane fluid is a copolymer containing from 1 to 99 mole percent of siloxane units of the formula

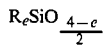

where R is selected from the group consisting of a monovalent hydrocarbon radical having from 1 to 18 carbon atoms and a halogenated monovalent hydrocarbon radical having from 1 to 18 carbon atoms and e is a number of from 0 to 2.

* * * * *